US011288187B2

(12) United States Patent
Mao

(10) Patent No.: US 11,288,187 B2
(45) Date of Patent: Mar. 29, 2022

(54) ADDRESSING SWITCH SOLUTION

(71) Applicant: SK hynix Inc., Icheon-si (KR)

(72) Inventor: Jinliang Mao, Milpitas, CA (US)

(73) Assignee: SK hynix Inc., Icheon-si (KR)

( * ) Notice: Subject to any disclaimer, the term of this patent is extended or adjusted under 35 U.S.C. 154(b) by 120 days.

(21) Appl. No.: 16/264,358

(22) Filed: Jan. 31, 2019

(65) Prior Publication Data

US 2019/0303291 A1 Oct. 3, 2019

Related U.S. Application Data

(60) Provisional application No. 62/649,495, filed on Mar. 28, 2018.

(51) Int. Cl.
*G06F 12/06* (2006.01)
*G06F 13/20* (2006.01)

(52) U.S. Cl.
CPC .......... *G06F 12/0615* (2013.01); *G06F 12/06* (2013.01); *G06F 13/20* (2013.01); *G06F 2212/65* (2013.01); *G06F 2213/0026* (2013.01)

(58) Field of Classification Search
CPC ...... G06F 12/06; G06F 13/20; G06F 2212/65; G06F 2213/0026; G06F 3/06; G06F 12/0615
See application file for complete search history.

(56) References Cited

U.S. PATENT DOCUMENTS

| | | | | |
|---|---|---|---|---|
| 4,145,739 A | * | 3/1979 | Dunning | G06F 3/0601 709/211 |
| 5,313,300 A | * | 5/1994 | Rabi | G09G 1/285 341/144 |
| 5,740,404 A | * | 4/1998 | Baji | G06F 12/0653 710/16 |
| 6,158,046 A | * | 12/2000 | Yoshida | G06F 9/30156 712/E9.037 |
| 6,567,880 B1 | * | 5/2003 | Olarig | G06F 3/14 710/305 |
| 7,715,450 B2 | * | 5/2010 | Ohara | G06F 13/4226 370/536 |
| 10,193,631 B1 | * | 1/2019 | Chen | G06F 3/0622 |

(Continued)

OTHER PUBLICATIONS

Corbet, Jonathan, Alessandro Rubini, and Greg Kroah-Hartman. Linux Device Drivers: Where the Kernel Meets the Hardware. Chapter 15.4. "O'Reilly Media, Inc.", 2005. (Year: 2005).*

(Continued)

*Primary Examiner* — Paul M Knight
(74) *Attorney, Agent, or Firm* — Weaver Austin Villeneuve & Sampson LLP

(57) ABSTRACT

An apparatus includes a first address converter coupled to a first device and a second device and configured to convert a first n-bit address received from the first device into an m-bit upper address portion and an (n–m)-bit lower address portion and forward the m-bit upper address through a side path and the (n–m)-bit lower address portion through a main path to the second device, m and n are positive integers, and a second address converter configured to assemble the m-bit upper address portion and the (n–m)-bit lower address portion to a second n-bit address that is a representation of the first n-bit address and provide the second n-bit address to a third device.

19 Claims, 6 Drawing Sheets

(56) References Cited

U.S. PATENT DOCUMENTS

| | | | | |
|---|---|---|---|---|
| 10,262,935 | B2* | 4/2019 | Kim | G11C 11/4087 |
| 2004/0228326 | A1* | 11/2004 | Pearson | H04L 29/06027 |
| | | | | 370/352 |
| 2004/0254789 | A1* | 12/2004 | Huang | G10L 19/032 |
| | | | | 704/229 |
| 2005/0114616 | A1* | 5/2005 | Tune | G06F 12/1441 |
| | | | | 711/163 |
| 2012/0117286 | A1 | 5/2012 | Yun et al. | |
| 2014/0052954 | A1* | 2/2014 | Moll | G06F 12/0215 |
| | | | | 711/205 |
| 2014/0068125 | A1* | 3/2014 | Pullagoundapatti | |
| | | | | G06F 13/1663 |
| | | | | 710/110 |
| 2014/0328104 | A1* | 11/2014 | Jeon | G11C 5/025 |
| | | | | 365/63 |
| 2016/0011985 | A1* | 1/2016 | Swaine | G06F 12/0815 |
| | | | | 711/206 |
| 2016/0062954 | A1* | 3/2016 | Ruff | G06F 40/205 |
| | | | | 715/249 |
| 2019/0012281 | A1* | 1/2019 | Hwang | G06F 12/063 |
| 2019/0205047 | A1* | 7/2019 | Hsieh | G06F 3/0607 |

OTHER PUBLICATIONS

Kant, Krishna, and Ravi Iyer. "Design and performance of compressed interconnects for high performance servers." Computer Design, 2003. Proceedings. 21st International Conference on. IEEE, 2003. (Year: 2003).*

Liu, Jiangjiang, Krishnan Sundaresan, and Nihar R. Mahapatra. "Dynamic address compression schemes: a performance, energy, and cost study." Computer Design: VLSI in Computers and Processors, 2004. ICCD 2004. Proceedings. IEEE International Conference on. IEEE, 2004. (Year: 2004).*

Memory System Compression and Its Benefits by Liu (Year: 2002).*

The performance advantage of applying compression to the memory system by Mahapatra; ACM Sigplan Notices. vol. 38. No. 2 supplement. ACM, 2002. (Year: 2002).*

Address Compression Through Base Register Caching by Park (Year: 1990).*

Why Windows Vista only sees 3GB memory in a PC with 4GB RAM and how Vista SP1 fools its users by Pietroforte (Year: 2008).*

Xilinx "AXI Reference Guide" UG761 V13.2, www.xilinx.com, Jul. 6, 2011, 102 pages.

* cited by examiner

ADDRESSING SWITCH SOLUTION

CROSS-REFERENCES TO RELATED APPLICATIONS

This application claims priority to U.S. Provisional Patent Application No. 62/649,495, entitled "FULL 64 BITS ADDRESSING SWITCH SOLUTION," filed Mar. 28, 2018, the disclosure of which is hereby incorporated by reference in its entirety for all purposes in the present disclosure.

FIELD OF THE INVENTION

The present invention relates generally to a computer interconnect architecture, and more particularly to an apparatus, a semiconductor device, and a method of providing a full address to a host device while a portion of the full address has been used to access other devices.

BACKGROUND

Peripheral Component Interconnect Express (PCIe) is a standard that allows a high-speed serial data transfer between peripheral devices and a host. As a PCIe enterprise system grows, it may be necessary to fully use a 64-bit address. In such case, a PCIe endpoint may send out requests with the full 64-bit host address.

Many semiconductor device architectures, such as Advanced eXtensible Interface (AXI) based architectures, operate at fixed addresses, e.g., a 64-bit address. When an AXI master is accessing two or more AXI slave regions by going through an AXI switch, the AXI switch will normally use the most significant bit (MSB) AXI address portion for decoding a slave region of the switch, so that each AXI slave region will have an address range of 63 bits or less.

The fixed address range could be a problem, when an AXI slave region is trying to access the full address range of a host (i.e., full 64-bit address). One application example is the Non-Volatile Memory Express (NVMe) application. An NVMe module may either access the host memory, or controller memory buffer (CMB) which is inside a PCIe controller. By default, after an AXI switch, an effective address range of 63 bits or less will be available to address a host.

FIG. 1 is a block diagram illustrating a communication relationship between an AXI master 101 and a host 105, as known in the art. Referring to FIG. 1, the AXI master 101 sends a read or write request to the host 105 via an AXI switch 103 with a full address range 102 of 64 bits according to the AXI bus protocol. The AXI switch 103 may have one or more slave regions that consume a portion of the full address range 102 of the AXI address bus. Referring to FIG. 1, if the AXI switch 103 has a first slave region 1 and a second slave region 2, 1 bit of the full address range 102 is used to address (access) the first slave region 1 and the second slave region 2 so that only 63 bits are remaining and available as address bits for the host. More bits of the full address range 102 will be used if the AXI switch has more than 2 slave regions so that even fewer address bits will be available for the host 105 that supports a 64-bit address space.

It would thus be highly desirable to conserve the full address range for addressing the host. The present invention provides novel technical solutions to resolve the host memory full 64-bit addressing access range problem. The inventive concepts may also be applied to other semiconductor design and architecture areas where a full range for access address is needed or desired.

SUMMARY

Embodiments of the present invention provides an apparatus, device and method of providing a full address range to a host even when a portion of the full address range is used for addressing other devices or components.

According to an embodiment, an apparatus includes a first address converter coupled to a first device and a second device and configured to convert a first n-bit address received from the first device into an m-bit upper address portion and an (n−m)-bit lower address portion and forward the m-bit upper address portion through a sideband path and the (n−m)-bit lower address portion through a main path to the second device, m and n are positive integers. The apparatus also includes a second address converter configured to assemble the m-bit upper address portion and the (n−m)-bit lower address portion to a second n-bit address that is a representation of the first n-bits address.

In one embodiment, the first n-bit address is an advanced extensible interface (AXI) address.

In one embodiment, the first device is an advanced extensible interface (AXI) master device, and the second device is an AXI switch.

In one embodiment, the second address converter includes a first input terminal configured to receive the m-bit upper address portion through the sideband path, a second input terminal configured to receive the (n−m)-bit lower address portion through the main path, and a first output terminal configured to output the second n-bit address to a third device.

In one embodiment, the third device is a host device. In one embodiment, the first address converter and the second address converter are integrated on a same semiconductor die.

In one embodiment, the second device is an AXI switch, the first address converter, and the second address converter are integrated on a same semiconductor die.

In one embodiment, the m-bit upper address portion includes most significant bits (MSB) of the first n-bit address configured to access a plurality of external devices, and the (n−m)-bit lower address portion includes least significant bits (LSB) of the first n-bit address configured to be shared by the plurality of external devices.

In one embodiment, m is equal to 1 and n is equal to 64.

Embodiments of the present invention also provide a semiconductor device. The semiconductor device includes an input configured to receiving a first n-bit address and command signals from a first device, a controller configured to generate control signals in response to the received command signals, a disassembler unit configured to disassemble the first n-bit address into an m-bit upper address portion and an (n−m)-bit lower address portion, a first register configured to store the m-bit upper address portion, a second register configured to store the (n−m)-bit lower address portion in response to the control signals, and a first output configured to output the m-bit upper address portion, and a second output configured to output the (n−m)-bit lower address portion to a second device. The variables m and n are positive integers.

In one embodiment, the first device is an advanced extensible interface (AXI) master device, and the second device is an AXI switch.

In one embodiment, the semiconductor device further includes an assembler configured to assemble the stored m-bit upper address portion and the stored (n−m)-bit lower address portion to a second n-bit address that is representative of the first n-bit address and provide the second n-bit address to a host device.

In one embodiment, the m-bit upper address portion includes most significant bits (MSB) of the first n-bit address. In one embodiment, m is equal to 1 and n is equal to 64.

Embodiments of the present invention also provide a method of providing a full address to a host device, wherein a portion of the full address has been used to access other devices. The method may include receiving a first full address having n bits from a first device by a semiconductor device, disassembling the first full address into an upper address portion having m bits and a lower address portion having (n−m) bits by a first address converter, decoding the upper address portion for accessing a portion of a second device, storing the upper address portion and the lower address portion in a plurality of registers, assembling the upper address portion and the lower address portion stored in the registers to a second full address that is a representation of the first full address by a second address converter, and outputting the second full address to the host device.

In one embodiment, the method may further include receiving commands from the first device by the semiconductor device, wherein disassembling the first full address is based on one of the received commands.

In one embodiment, the first device is an advanced extensible interface (AXI) master device, and the second device is an AXI switch. In one embodiment, the first and second address converters are integrated on a same die.

The following description, together with the accompanying drawings, will provide a better understanding of the nature and advantages of the claimed invention.

BRIEF DESCRIPTION OF THE DRAWINGS

The accompanying drawings form a part of the present disclosure, that describe exemplary embodiments of the present invention. The drawings together with the specification will explain the principles of the invention.

DETAILED DESCRIPTION OF THE INVENTION

High Level Description

AXI is a high performance, high bandwidth and low delay bus protocol that specifies an address range of 64 bits. The address, control and data transmission of AXI are separated from each other and use a byte strobe signal to support unaligned data transmission. Separate read/write data channels of the AXI bus effectively support low-cost direct memory access operations and enable simultaneous emission of a plurality of addresses. Since the AXI protocol supports simultaneous emission of a plurality of addresses, a full address range may not be made available to a host if a number of additional devices are required to be supported by the AXI bus.

It is desirable in many applications to provide the full address range to the host. Since the AXI bus has a fixed address range, and it is a time consuming process to request changes in the specification to increase the number of address bits. Even if the protocol specification can be revised and updated, it still takes a significant amount of time and effort for all the related AXI master/slave/switch modules to support the updated specification. Therefore, it is impractical to request a change to the fixed address range of the AXI bus interface.

Although the present invention is described with reference to a specific communication protocol, it will be appreciated that those of skill in the art that the routing of the addresses should not be limited to the specific communication protocol. The description can thus be applied to other communication protocols with proper modifications and alterations as will be understood by a person skilled in the art.

There are AXI sideband signals coming with the AXI address. These AXI sideband signals have the same protocol timing relation as the AXI address. The present invention provides efficiency improvements in the address range by storing MSB bits of the AXI true address into the AXI sidebands. After passing through an AXI switch, these MSB bits of the AXI true address are reassembled back to the AXI full address after they have been used in the decoder for accessing the AXI slave regions.

To satisfy the requirements of decoding slave regions, the region decoder address (false address) is placed into the AXI bus address. After decoding the AXI slave regions, these region decoder address (false address) is replaced by the AXI true address.

By using an address conversion scheme between the AXI address and sideband signals, the address information can be conserved or restored.

Figure 1:
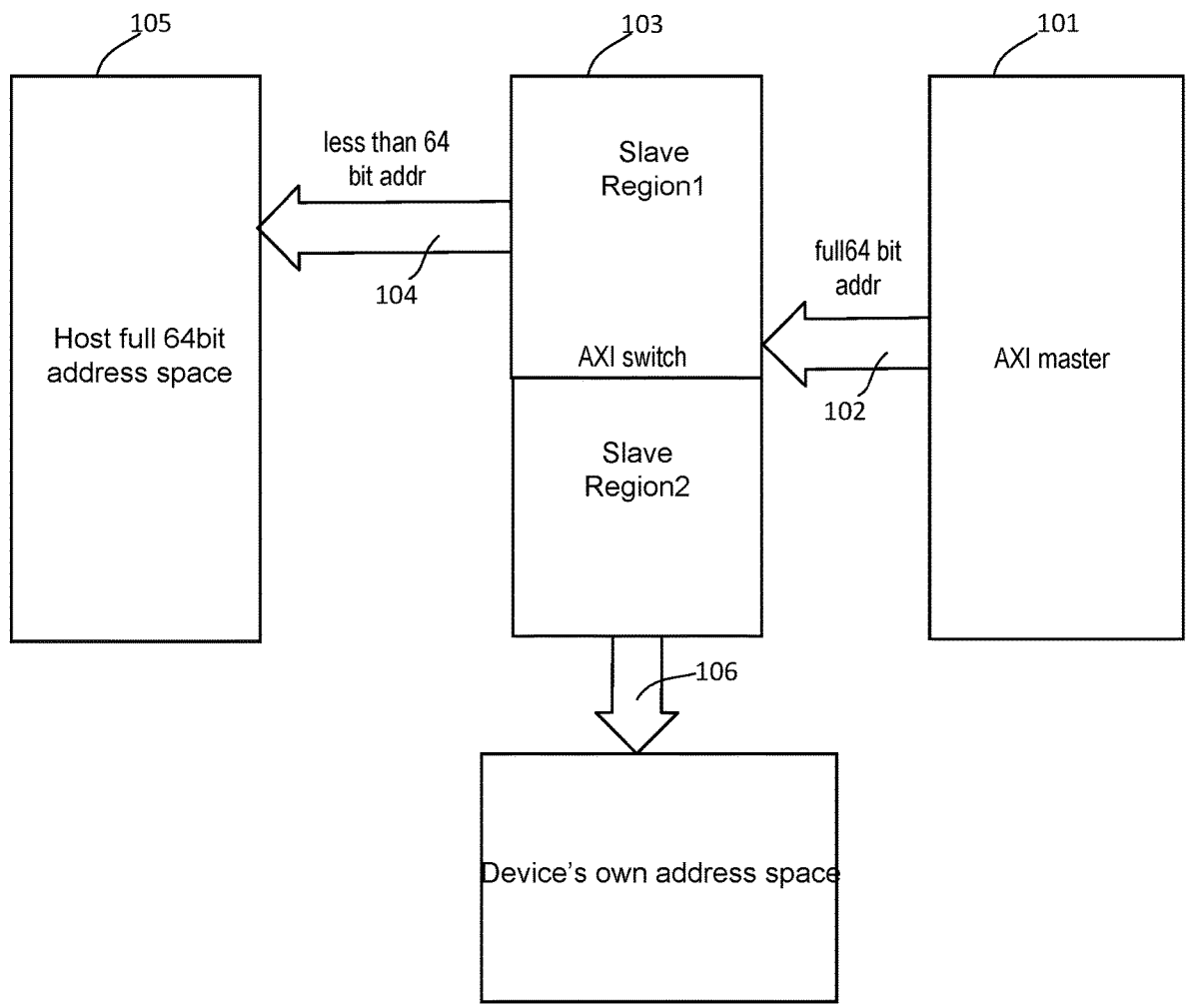
FIG. 1 is a block diagram illustrating a communication relationship between an AXI master 101 and a host 105, as known in the art.
Figure 2:
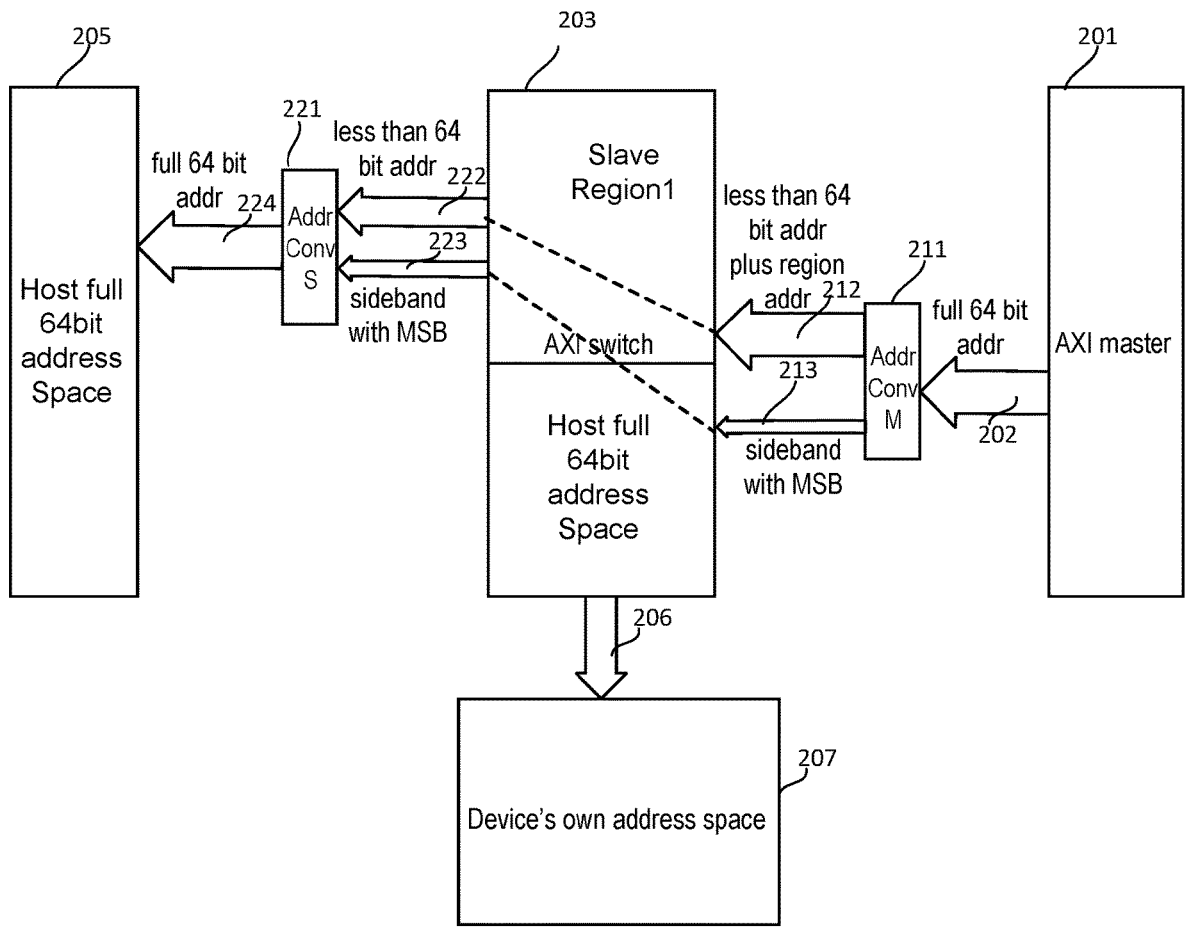
FIG. 2 is a block diagram illustrating a communication relationship between an AXI master and a host according to an embodiment of the present invention

FIG. 2 is a block diagram illustrating a communication relationship between an AXI master 201 and a host 205 according to an embodiment of the present invention. Referring to FIG. 2, the AXI master 201 sends out a full 64-bit address 202 intending to access the host 205 via an AXI switch 203. An address converter (M) 211 is disposed between the AXI master 201 and the AXI switch 203 and configured to place the upper address portion (most significant bits, MSBs) to a sideband 213, and replace the same address field (the upper address portion, or the MSBs) with a region address for decoding slave regions in the AXI switch. The new address with the correct region decoder address will pass through the AXI switch 203, and access a proper slave region (e.g., slave region 1 or slave region 2). After the AXI switch, the effective address 222 is fewer than or equal to 63 bits (the remaining address portion or the least significant bits, LSBs, of the full 64-bit address). Signals in the sideband 213 will pass through the AXI switch as sideband address 223 without change. An address converter (S) 221 is disposed between the AXI switch 203 and the host 205 and configured to assemble the upper address portion (MSBs) with the AXI effective address (LSBs), thereby reconstructing the full 64-bit address 224 that is a representation of the full address 202 and provide the full address 224 of 64 bits to the host 205. The AXI switch may also access its own address space 207 through an interface 206.

Equation

The following terms are used throughout the specification to describe the present invention:

A. The AXI Address after the AXI Master is: AXI_Addrm.

B. The AXI address after the address converter (M) is: {RegionAddr[m−1:0], AXI_Addrm[63−m:0]}.

The Sideband after the address converter (M) is: AXI_Addrm[m−1:0].

C. The AXI address after the AXI switch is: {RegionAddr[m−1:0], AXI_Addrm[63−m:0]}.

The Sideband after the AXI switch is: AXI_Addrm[m−1:0].

D. The AXI address after the address converter S is: AXI_Addrm, which is a full 64-bit address.

Example

The following example illustrates the address conversion according to an embodiment of the present invention. In the example:

The AXI master is a nonvolatile memory express (NVMe) module, which can access both the host and an on-chip double data rate (DDR) dynamic random access memory (DRAM). NVM Express (NVMe) is an open logical device interface specification for accessing nonvolatile storage media. The host may include, e.g., a Root Complex connected to one or more CPUs and memory. The AXI switch is operable to access the host when the incoming addr[63] bit=0. The AXI switch is operable to access the on-chip DDR DRAM when the incoming addr[63] bit=1. The addr [63] bit is thus operating as the region decoder address.

In this example, the NVMe module operates to fetch data stored in the host starting at address 'xF800_AA00_5500_0000,' which is a hexadecimal value (i.e., "F" represents "1111" in binary form or "15" in decimal form, and "A" represents "1010" in binary form or "10" in decimal form). If this target address 'xF800_AA00_5500_0000' is sent to the AXI switch directly, this data fetch request will be directed to the on-chip DDR DRAM instead to the host.

In accordance with the present invention, the address converter (M) will convert the target address 'xF800_AA00_5500_0000' to a converted slave_address 'x7800_AA00_5500_0000' and a sideband signal is "1" to hold the addr63 bit value.

Since the new address is 'x7800_AA00_5500_0000,' the AXI switch will direct the data fetch request to the host.

The AXI switch outputs the converted address 'x7800_AA00_5500_0000' to the address converter (S). The address converter (M) outputs the sideband signal "1" to the address converter (S).

The address converter (S) will concatenate (assemble) the sideband signal and the converted address to be {sideband, slave_addr[62:0]}, which generates the address value {1,'x7800_AA00_5500_000}='xF800_AA00_5500_0000'.

Later on, the address 'xF800_AA00_5500_0000' may pass through a PCIe controller which generates a transaction layer packet (TLP) and sends the request to the host. The TLP address is 'xF800_AA00_5500_0000'.

Since the TLP address can have a full 64-bit address space, it is able to access systems with the full 64-bit address range.

With this example, the NVMe module can access the host with a full 64-bit address without any limitation.

Figure 3:
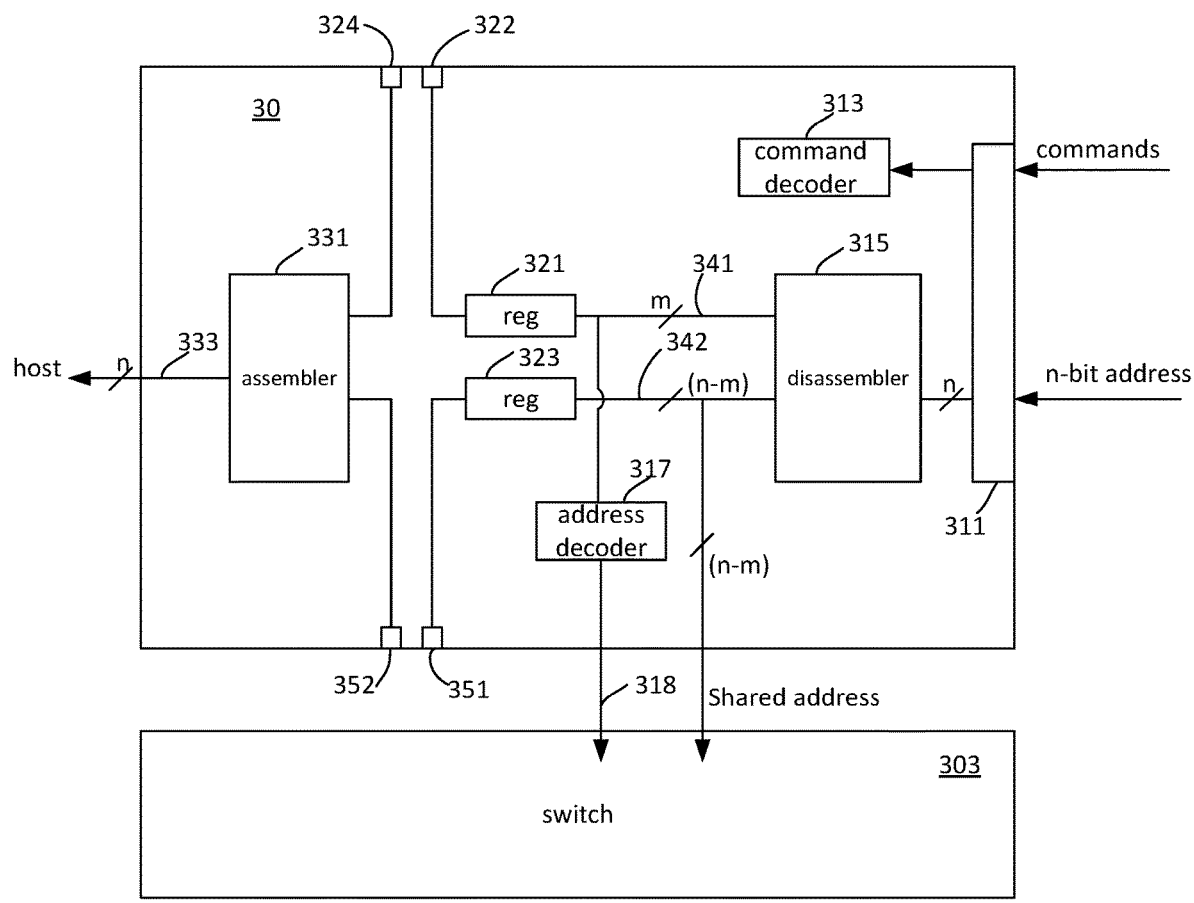
FIG. 3 is a simplified block diagram of a single integrated device that operates as an address converter M and an address converter S according to an embodiment of the present invention.

FIG. 3 is a simplified block diagram of a single integrated device 30 that operates as the address converter (M) and the address converter (S) according to an embodiment of the present invention. Referring to FIG. 3, the integrated device 30 includes an input port 311 for receiving command signals and a full n-bit address from a master device (e.g., AXI master device 201), a command decoder 313 configured to decode the command signals, and a disassembler unit 315 configured to disassemble the n-bit address into an m-bit upper address portion 341 and an (n−m)-bit lower address portion 342 based on one of the decoded command signals. The m-bit upper address portion 341 is provided to an address decoder 317 that decodes the m-bit upper address portion to provide enable or select signals 318 for accessing different regions of a switch 303 (e.g., slave region 1 or slave region 2 of the AXI switch 203 in FIG. 2). The integrated device 30 further includes a register 321 for storing the m-bit upper address portion and a register 323 for storing the (n−m) bit lower address portion. The integrated device also includes an address assembler unit 331 coupled to the registers 321 and 323 and configured to assemble the m-bit upper address portion and (n−m)-bit lower address portion stored in the registers 321 and 323 back to a full n-bit address 333 and provide to the host (e.g., the host 205).

In some embodiments, the integrated device 30 may include an output port 322 connected to the output of the register 321 configured to provide the m-bit upper address portion with sideband signals to the address assembler unit 331 along the (n−m)-bit lower address portion of the register 323. The integrated device 30 may also include an input port 324 connected to the address assembler unit 331 to provide the m-bit upper address portion in the sideband signals to the address assembler unit 331. Similarly, the integrated device 30 may include an output port 351 connected to the output of the register 323 configured to output the (n−m)-bit lower address portion and an input port 352 configured to receive the (n−m)-bit lower address portion and provide to the address assembler unit 331.

In some embodiments, the integrated device 30 is integrated with the switch 303 (e.g., the AXI switch 203) on a same semiconductor die. In some embodiments, the registers 321 and 323 may be formed of CMOS latches or D-flip-flops that are synchronously clocked by a same clock as the clock for the command signals and the address provided by the master device.

Figure 4:
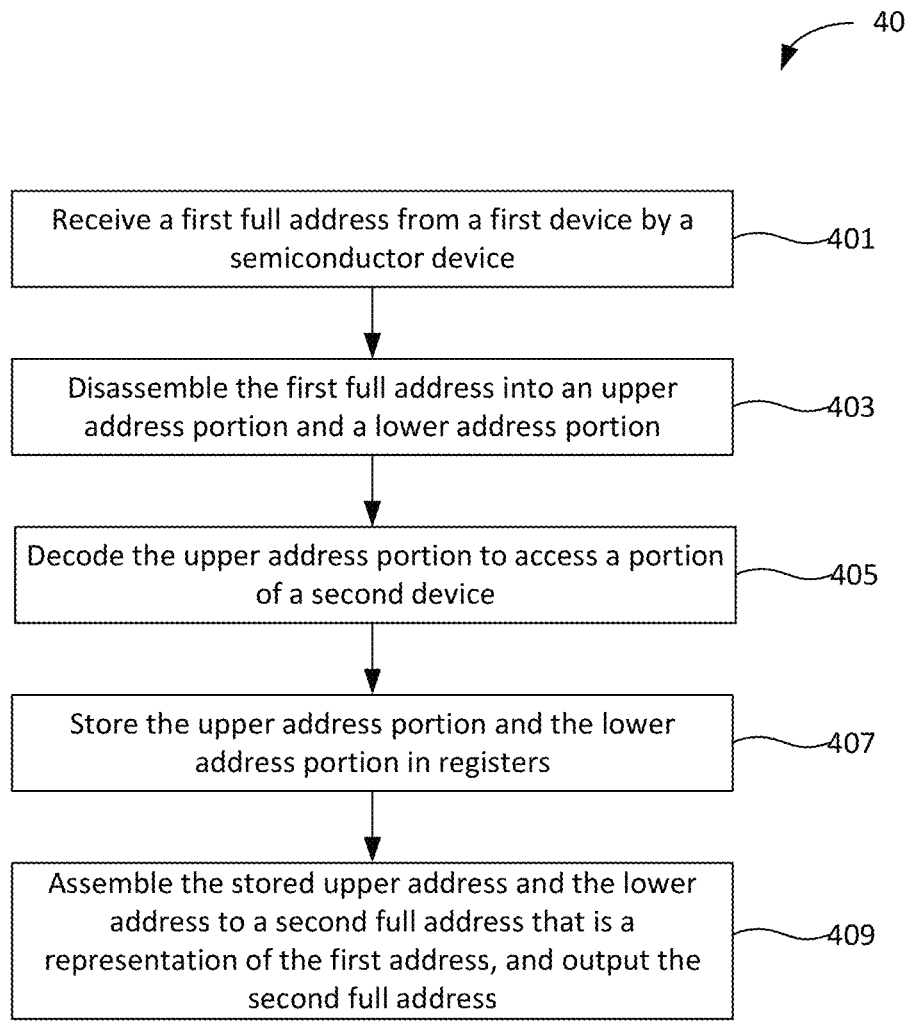
FIG. 4 is a flowchart of a method of providing a full address to a host device where a portion of the full address has been used to access other devices according to an embodiment of the present invention.

FIG. 4 is a flowchart of a method 40 of providing a full address to a host device where a portion of the full address has been used to access other devices according to an embodiment of the present invention. Referring to FIG. 4, the method 40 may include receiving a first full address from a first device by a semiconductor device (step 401). The first device may be a requester device, e.g., the AXI master device 201, and the semiconductor device may be the address converter (M) 211, and the first full address may include n bits (e.g., 64-bit address conforming to the AXI protocol specification). At step 401, command or request signals may also be received by the semiconductor device that decodes the command or request signals. The method also includes disassembling (separating, dividing) the first full address into an upper address portion and a lower address portion (step 403) in response to the decoded command or request signal. The upper address portion may include m most significant bits (MSBs) of the first full address, and the lower address portion may include (n−m) remaining bits of the first full address (n bits). At step 405, the method further includes decoding the upper address portion for accessing a portion of a second device using the upper address portion. In an embodiment, if the upper address portion has more than one bit, i.e., the second device may have more than two regions, the decoded upper address portion will provide enable or select signals to determine which regions of the second device is to be accessed. The second device may be an AXI switch such as the AXI switch 203. At step 407, the method also includes storing the upper address portion and the lower address portion in respective registers (e.g., the registers 321 and 323 of FIG. 3). The method 40 also includes assembling the stored upper address portion and the lower address portion to a second full address of n bits that is a delayed version of the first full address and outputting the second full address to a third device (e.g., the host device 205) at step 409.

Figure 5:
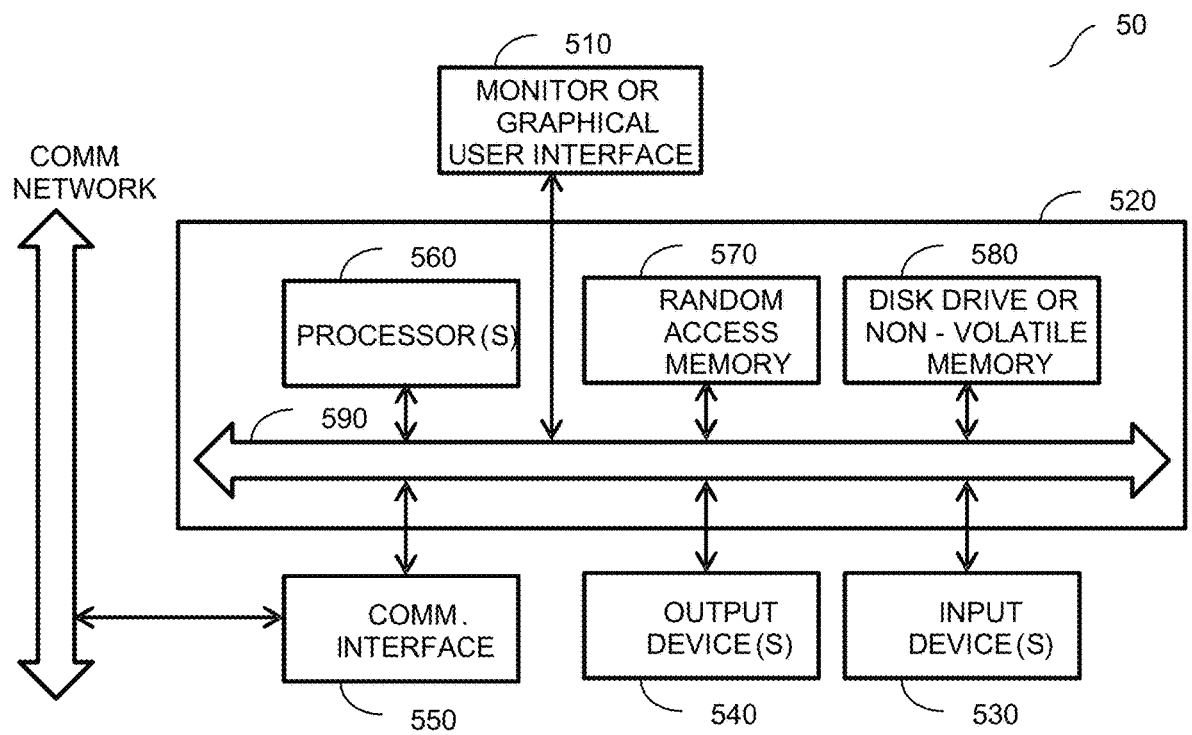
FIG. 5 is a simplified block diagram of an integrated device that can perform the operations of the semiconductor device of FIG. 3 and the process steps described in FIG. 4 according to an embodiment of the present invention.

FIG. 5 is a simplified block diagram of a system or an integrated device 50 that can performs the operations of the semiconductor device 30 of FIG. 3 and the process steps described in FIG. 4 according to an embodiment of the present invention. FIG. 5 describes one potential implementation of an integrated device which may be used to provide a full address (e.g., 64-bit addressing) to a host device even when a portion of the full address of a master device has been used to access one or more regions of a switch disposed between of the integrated device and the host device. FIG. 5 is merely illustrative of an embodiment incorporating the present invention and does not limit the scope of the invention as recited in the claims. One of ordinary skill in the art would recognize other variations, modifications, and alternatives. In one embodiment, the system or integrated device 50 typically includes an interconnect bus 590 coupled to a monitor 510, a computer 520, user output devices 530, user input devices 340, a communications interface 550, and the like.

Referring to FIG. 5, the computer 520 may include a processor(s) 560 that communicates with a number of peripheral devices via the interconnect bus 590. These peripheral devices may include user input devices 530, user output devices 540, communications interface 550, and a storage subsystem, such as random access memory (RAM) and dual-port FIFOs 570, and disk drive or nonvolatile memory 580.

The User input devices 530 include all possible types of devices and mechanisms for inputting information to computer system 520. These may include a keyboard, a keypad, a touch screen incorporated into the display, audio input devices such as voice recognition systems, microphones, and other types of input devices. In various embodiments, the user input devices 530 are typically embodied as a computer mouse, a trackball, a track pad, a joystick, wireless remote, drawing tablet, voice command system, eye tracking system, and the like. The user input devices 530 typically allow a user to select objects, icons, text and the like that appear on the monitor 510 via a command such as a click of a button or the like.

The user output devices 540 include all possible types of devices and mechanisms for outputting information from computer 520. These may include a display (e.g., monitor 510), non-visual displays such as audio output devices, etc.

The communications interface 550 provides an interface to other communication networks and devices. The communications interface 550 may serve as an interface for receiving data from and transmitting data to other systems. Embodiments of communications interface 550 typically include an Ethernet card, a modem (telephone, satellite, cable, ISDN), (asynchronous) digital subscriber line (DSL) unit, FireWire interface, USB interface, and the like. For example, the communications interface 550 may be coupled to a computer network, to a FireWire bus, or the like. In other embodiments, communications interfaces 550 may be physically integrated on the motherboard of computer 520, and may be a software program, such as software DSL, or the like.

In various embodiments, the integrated device 50 may also include software that enables communications over a network such as the HTTP, TCP/IP, RTP/RTSP protocols, and the like. In alternative embodiments of the present invention, other communications software and transfer protocols may also be used, for example IPX, UDP or the like. In some embodiments, the computer 520 includes one or more processors or CPUs 560. Further, one embodiment, integrated device 50 includes a UNIX-based operating system.

The RAM (dual-port FIFOs) 570 and the disk drive (nonvolatile memory) 580 are examples of tangible media configured to store data such as embodiments of the present invention, including executable computer code, human readable code, or the like. Other types of tangible media include floppy disks, removable hard disks, optical storage media such as CD-ROMS, DVDs and bar codes, semiconductor memories such as flash memories, non-transitory read-only-memories (ROMS), battery-backed volatile memories, networked storage devices, and the like. The RAM 570 and nonvolatile memory 580 may be configured to store the basic programming and data constructs that provide the functionality of the present invention. For example, the RAM and nonvolatile memory 580 may include software to translate layers and packets between the master device and the integrated device 50, provide access to configuration registers and storage registers, and decode commands received from the master device (device 201).

Software code modules and instructions that provide the functionality of the present invention may be stored in RAM 570 and nonvolatile 580. These software modules may be executed by the processor(s) 560. The RAM 570 and nonvolatile 580 may also provide a repository for storing data used in accordance with the present invention.

The RAM 570 and nonvolatile 580 may include a number of memories including a main random access memory (RAM) for storage of instructions and data during program execution and a read only memory (ROM) in which fixed non-transitory instructions are stored. The Ram 370 may also include configuration registers and storage registers. The RAM 570 and nonvolatile 380 may include a file storage subsystem providing persistent (nonvolatile) storage for program and data files. The RAM 570 and nonvolatile 580 may also include removable storage systems, such as removable flash memory.

Bus subsystem 590 provides a mechanism for letting the various components and subsystems of computer 520 communicate with each other as intended. Although the bus subsystem 590 is shown schematically as a single bus, alternative embodiments of the bus subsystem may utilize multiple busses.

FIG. 5 is representative of an integrated device 50 capable of embodying the present invention. It will be readily apparent to one of ordinary skill in the art that many other hardware and software configurations are suitable for use with the present invention.

Figure 6:
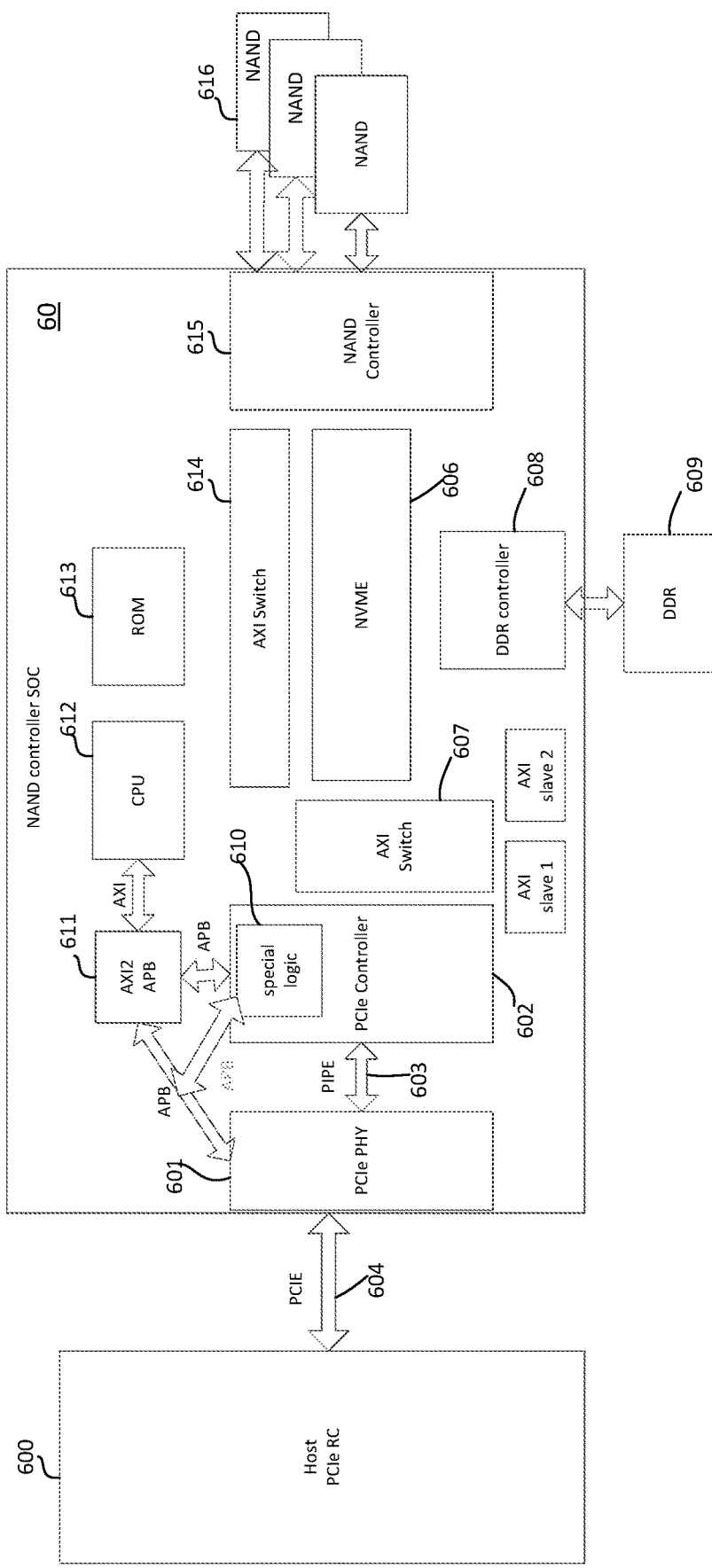
FIG. 6 is a simplified block diagram illustrating an integrated circuit in communication with a host having a PCI Express module with a root complex according to some embodiments of the present invention.

FIG. 6 is a block diagram illustrating an integrated circuit 60 in communication with a host having a PCI Express module with a root complex according to some embodiments of the present invention. In some embodiments, the integrated circuit 60 may be a NAND controller system on-chip (SOC). The integrated circuit 60 may include a PCIe physical layer (PHY) interface unit 601 for exchanging commands and data with a host 600 having a PCI Express module with a root complex (PCIe RC). The integrated circuit (NAND controller SOC) 60 may further include a PCIe controller unit 602 in communication with the PCIe PHY unit 601 through a PIPE interface 603. The integrated circuit 60 may further include a NVMe module 606, which can be in communication with the host 600 or a double data rate (DDR) memory 609. In some embodiments, the NVMe module 606 may be configured to communicate with the DDR memory 609 using a DDR controller 608. In some embodiments, the NVMe module 606 may be configured as an AXI master, such as the AXI master 201. In some embodiments, the NVMe module 606 may be configured to communicate with the host 600 using an AXI switch 607. In some embodiments, the AXI switch 607 may be in communication with one or more AXI slaves such as AXI slave 1, AXI slave 2. In some embodiments, the integrated circuit 60 may further include special logic 610 including a command decoder unit configured to operate as a first address converter (address converter (M)), and a second address converter (address converter (S)). The first address converter is disposed between the NVMe module 606 and the AXI switch 607 and configured to divide the n-bit address provided by the NVMe to an m-bit upper address portion and an (n−m)-bit lower address portion in response to a decoder command signal. For example, the in-bit upper address portion selects one of the AXI slaves and the (n−m)-bit lower address portion addresses the selected AXI slaves. The special logic 610 also includes registers configured to store the in-bit upper address portion and the (n−m)-bit lower address portion and provide to the second address converter. The second address converter is configured to assemble the m-bit upper address portion and the (n−m)-bit lower address portion back to the n-bit address and provide to the host 600 through the PCIe controller 602 and the PCIe PHY unit 601. The special logic may operate in a similar manner as the integrated device 30 shown and described in FIG. 3. In some embodiments, the special logic 610 may convert the AXI protocol of the AXI switch 607 to a PCIe protocol and transmit the con Still referring to FIG. 6, the integrated circuit 60 may further include an AXI to APB conversion module 611 disposed between the PCIe PHY unit 601 and a CPU 612. The AXI to APB conversion module 611 is configured to translate the AXI communication to the advanced peripheral bus (APB), The CPU 612 may also communicate with the special logic 610 via the AXI to APB conversion module 611. The integrated circuit 60 may also include other memory units such as static random access memory (SRAM) and read-only memory (ROM) configured to store program instructions and data constructs that are executable by the CPU to provide the functionality of the present invention. The CPU 612 may communicate with the NVMe module 606 through an AXI switch 614. In the example, the CPU 612 operates on the AXI communication protocol. It is understood that the CPU 612 may have multiple processing units each may operate on different communication protocols, e.g., advanced high performance bus (AHB), APB, PCIe communication protocol, etc. The integrated circuit 60 may also include NAND flash controller 615 in communication with one or more NAND flash memory devices 616.

Various embodiments of the present invention can be implemented in the form of logic in software or hardware or a combination of both. The logic may be stored in a computer readable or machine-readable non-transitory storage medium as a set of instructions adapted to direct a processor of a computer system to perform a set of steps disclosed in embodiments of the present invention. The logic may form part of a computer program product adapted to direct an information-processing device to perform a set of steps disclosed in embodiments of the present invention. Based on the disclosure and teachings provided herein, a person of ordinary skill in the art will appreciate other ways and/or methods to implement the present invention.

The data structures and code described herein may be partially or fully stored on a computer-readable storage medium and/or a hardware module and/or hardware apparatus. A computer-readable storage medium includes, but is not limited to, volatile memory, nonvolatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described herein include, but are not limited to, application-specific integrated circuits (ASICs), field-programmable gate arrays (FPGAs), dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes. The methods and processes disclosed herein may be embodied using a combination of code, data, and hardware modules or apparatuses.

In accordance with the present invention, the AXI sideband signals are used to pass through the most significant bit(s) (MSB) of the address. In some embodiments, the sideband signals are required to have the same protocol sequence as the AXI address. To satisfy this requirement, an AXI network interface card (NIC) needs to be programmed accordingly. In some embodiments, the address converter (M) and the address converter (S) can be implemented using digital logic. In other embodiments, the address converter (M) and the address converter (S) can be implemented using a combination of hardware and software. Embodiments of the present invention are very useful in transferring and accessing data between multiple memory resources and are particularly applicable to full address data movement among a host and DDR memory spaces across an AXI switch.

The embodiments disclosed herein are not to be limited in scope by the specific embodiments described herein. Various modifications of the embodiments of the present invention, in addition to those described herein, will be apparent to those of ordinary skill in the art from the foregoing description and accompanying drawings. Further, although some of the embodiments of the present invention have been described in the context of a particular implementation in a particular environment for a particular purpose, those of ordinary skill in the art will recognize that its usefulness is not limited thereto and that the embodiments of the present invention can be beneficially implemented in any number of environments for any number of purposes.

What is claimed is:

1. An apparatus comprising:
   a first address converter coupled to a first device and a second device; and
   a second address converter coupled to the second device and a third device,
   wherein the first address converter is configured to:
      receive a first n-bit address comprising a first m-bit upper address portion and an (n−m)-bit lower address portion from the first device, m and n being positive integers;
      replace the first m-bit upper address portion with a region address portion for decoding two or more regions in the second device, wherein each of the two or more regions in the second device has an address range of (n−m) or fewer bits, and wherein an address range of a region of the two or more regions in the second device is used for accessing the third device; and
      forward the first m-bit upper address portion through a sideband path to the second address converter; and
   wherein the second address converter is configured to:
      receive the first m-bit upper address portion through the sideband path and the (n−m)-bit lower address portion through a main path;
      assemble the first m-bit upper address portion and the (n−m)-bit lower address portion into a second n-bit address; and
      provide the second n-bit address to the third device for addressing the third device.

2. The apparatus of claim 1, wherein the first n-bit address is an advanced extensible interface (AXI) address.

3. The apparatus of claim 1, wherein the first device is an advanced extensible interface (AXI) master device, and the second device is an AXI switch.

4. The apparatus of claim 1, wherein the second address converter comprises a first input terminal configured to receive the first m-bit upper address portion through the sideband path, a second input terminal configured to receive the (n−m)-bit lower address portion through the main path, and a first output terminal configured to output the second n-bit address to the third device.

5. The apparatus of claim 1, wherein the third device is a host device.

6. The apparatus of claim 1, wherein the first address converter and the second address converter are integrated on a same semiconductor die.

7. The apparatus of claim 1, wherein the second device, the first address converter, and the second address converter are integrated on a same semiconductor die.

8. The apparatus of claim 1, wherein the first m-bit upper address portion comprises most significant bits (MSB) of the first n-bit address, the two or more regions of the second device comprise a plurality of regions, and the (n−m)-bit lower address portion comprises least significant bits (LSB) of the first n-bit address and is shared by the plurality of regions.

9. The apparatus of claim 1, further comprising a command decoder configured to receive commands from the first device and decode the received commands, wherein the first address converter is configured to replace the first m-bit upper address portion with the region address portion based on the decoded commands.

10. A semiconductor device comprising:
    an input configured to receive a first n-bit address from a first device;
    a disassembler unit configured to:
       disassemble the first n-bit address into a first m-bit upper address portion and an (n−m)-bit lower address portion, wherein m and n are positive integers; and
       replace the first m-bit upper address portion with a region address portion for decoding two or more regions in a second device, wherein each of the two or more regions in the second device has an address range of (n−m) or fewer bits, and wherein of a region of the two or more regions in the second device is used for accessing a third device;
    a first register configured to store the first m-bit upper address portion;
    a second register configured to store the (n−m)-bit lower address portion;
    a first output configured to output the stored first m-bit upper address portion to a sideband path;
    a second output configured to output the stored (n−m)-bit lower address portion to a main path; and
    an assembler unit having a first input for receiving the stored first m-bit upper address portion through the sideband path and a second input for receiving the stored (n−m)-bit lower address portion through the main path, the assembler unit configured to assemble the received m-bit upper address portion and the received (n−m)-bit lower address portion to a second n-bit address that is the same as the first n-bit address and provide the second n-bit address to the third device for addressing the third device.

11. The semiconductor device of claim 10, wherein the first device is an advanced extensible interface (AXI) master device, and the second device is an AXI switch.

12. The semiconductor device of claim 10, further comprising an address encoder coupled to the disassembler and configured to encode the first m-bit upper address portion to provide a select signal to at least one region of the two or more regions in the second device.

13. A method comprising:
    receiving, by a first converter from a first device, a first address including a first upper address portion having an upper address size and a lower address portion having a lower address size;
    replacing, by the first converter, the first upper address portion with a region address portion to select at least one region from two or more regions in a second device, wherein each of the two or more regions in the second device has an address range equal to or less than the lower address size, and wherein an address range of at least one region of the two or more regions in the second device is used for accessing a host device;
    decoding the region address portion to access the at least one region of the two or more regions in the second device;
    passing the first upper address portion through a sideband path and the lower address portion through a main path to a second converter disposed between the second device and the host device;
    assembling, by the second converter, the first upper address portion and the lower address portion into a second address for addressing the host device; and
    outputting the second address to the host device by the second converter.

14. The method of claim 13, wherein the first converter and the second converter are integrated in a same integrated device.

15. The method of claim 13, wherein the first device is an advanced extensible interface (AXI) master device, and the second device is an AXI switch.

16. The method of claim 14, further comprising:
receiving commands from the first device by the integrated device;
wherein replacing the first upper address portion with the region address portion is based on the received commands.

17. The method of claim 13, wherein outputting the second address to the host device conforms to a peripheral component interconnect express protocol.

18. The method of claim 13, wherein the first device communicates with the host device using an advanced extensible interface protocol.

19. The semiconductor device of claim 12, further comprising a command decoder configured to receive commands from the first device and decode the received commands, wherein the address encoder is configured to encode the first m-bit upper address portion to provide the select signal to the at least one region of the two or more regions in the second device based on the decoded commands.

* * * * *